US012790461B2

(12) United States Patent
Noguchi et al.

(10) Patent No.: US 12,790,461 B2
(45) Date of Patent: Nov. 10, 2026

(54) PLASTICIZER COMPOSITION FOR VINYL CHLORIDE RESIN, PLASTISOL, AND COATING FILM THEREOF

(71) Applicant: DIC Corporation, Tokyo (JP)

(72) Inventors: Takafumi Noguchi, Ichihara (JP); Hiroki Tokoro, Ichihara (JP)

(73) Assignee: DIC Corporation, Tokyo (JP)

( * ) Notice: Subject to any disclaimer, the term of this patent is extended or adjusted under 35 U.S.C. 154(b) by 454 days.

(21) Appl. No.: 18/576,326

(22) PCT Filed: Jun. 2, 2022

(86) PCT No.: PCT/JP2022/022420

§ 371 (c)(1),
(2) Date: Jan. 3, 2024

(87) PCT Pub. No.: WO2023/281945

PCT Pub. Date: Jan. 12, 2023

(65) Prior Publication Data

US 2024/0309177 A1 Sep. 19, 2024

(30) Foreign Application Priority Data

Jul. 6, 2021 (JP) ................................ 2021-112082

(51) Int. Cl.

| | |
|---|---|
| ***C08K 5/11*** | (2006.01) |
| ***C08K 5/101*** | (2006.01) |
| ***C08K 5/12*** | (2006.01) |
| ***C09D 7/60*** | (2018.01) |
| ***C09D 127/06*** | (2006.01) |

(52) U.S. Cl.

CPC ................ *C08K 5/11* (2013.01); *C08K 5/101* (2013.01); *C08K 5/12* (2013.01); *C09D 7/60* (2018.01); *C09D 127/06* (2013.01)

(58) Field of Classification Search

CPC . C08K 5/11; C08K 5/101; C08K 5/12; C09D 7/60; C09D 127/06
USPC .......................................................... 524/293
See application file for complete search history.

(56) References Cited

FOREIGN PATENT DOCUMENTS

| | | | | | |
|---|---|---|---|---|---|
| CN | 109414912 | A | * | 3/2019 | ......... C08G 18/7671 |
| JP | H11245243 | A | * | 9/1999 | ......... C08G 18/0819 |
| WO | 1997/039060 | A1 | | 10/1997 | |
| WO | 2006/077131 | A1 | | 7/2006 | |
| WO | 2012/092366 | A1 | | 7/2012 | |
| WO | 2015/112285 | A1 | | 7/2015 | |

OTHER PUBLICATIONS

William D. Arendt et al., "New Dibenzoate Plasticizer Blends for PVC Applications", Journal of Vinyl & Additive Technology, 20, 2014, pp. 137-142 and its Abstract.

* cited by examiner

*Primary Examiner* — Kelechi C Egwim
(74) *Attorney, Agent, or Firm* — Troutman Pepper Locke LLP

(57) ABSTRACT

A plasticizer composition for a vinyl chloride resin which can impart an excellent plasticization property and cold resistance to a vinyl chloride resin plastisol and is excellent in a non-bleeding property is provided. Specifically, a plasticizer composition for a vinyl chloride resin including an aliphatic diester (A) of an aliphatic dicarboxylic acid having 2 to 12 carbon atoms and an aliphatic monoalcohol having 4 to 18 carbon atoms, an aromatic diester (B) of an aromatic monocarboxylic acid having 6 to 12 carbon atoms and a glycol having 2 to 12 carbon atoms, and a phthalate (C), in which aliphatic diester (A):aromatic diester (B)=65:35 to 95:5 (mass ratio) is satisfied and (aliphatic diester (A)+aromatic diester (B)):phthalate (C)=5:95 to 35:65 (mass ratio) is satisfied.

20 Claims, No Drawings

PLASTICIZER COMPOSITION FOR VINYL CHLORIDE RESIN, PLASTISOL, AND COATING FILM THEREOF

TECHNICAL FIELD

The present invention relates to a plasticizer composition for a vinyl chloride resin, a plastisol, and a coating film thereof.

BACKGROUND ART

In the manufacture of automobiles, a sealing agent (so-called a body sealer) is applied to a seam and the like of a steel plate and an automobile member constituting an automobile for waterproofing and rust prevention. After the application of the sealing agent, an intermediate coating material and a top coating material are applied and thermally cured.

A plastisol, which is a suspension liquid of vinyl chloride resin particles dispersed in a liquid plasticizer, is used as the sealing agent. As the plasticizer, a phthalate such as diisononyl phthalate (DINP) is used, but there was a problem that a plasticization property, a cold resistance, and the like are insufficient. In order to solve the problem, it has been proposed to further add an aromatic compound having a long-chain alkyl group as a plasticizer (for example, PTLs 1 and 2).

CITATION LIST

Patent Literature

PTL 1: WO2006/077131
PTL 2: WO1997/039060

SUMMARY OF INVENTION

Technical Problem

Even when a phthalate and an aromatic compound having a long-chain alkyl group were added to a vinyl chloride resin plastisol, the cold resistance to be obtained was insufficient, and the compatibility between the plasticizer and the vinyl chloride resin is insufficient, so that there was a problem that bleeding of the plasticizer occurs.

The technical problem to be solved by the invention is to provide a plasticizer composition for a vinyl chloride resin, which can impart excellent plasticization property and cold resistance to a vinyl chloride resin plastisol and is excellent in non-bleeding property.

Solution to Problem

As a result of intensive studies to solve the problems, the inventors have found that by adding specific amounts of a specific aliphatic diester and a specific aromatic diester to a phthalate, a plasticizer composition for a vinyl chloride resin which imparts the excellent plasticization property and the cold resistance to a vinyl chloride resin plastisol and in which the plasticizer itself has the excellent non-bleeding property can be obtained, and thus the invention has been completed.

That is, the invention relates to a plasticizer composition for a vinyl chloride resin including an aliphatic diester (A) of an aliphatic dicarboxylic acid having 2 to 12 carbon atoms and an aliphatic monoalcohol having 4 to 18 carbon atoms, an aromatic diester (B) of an aromatic monocarboxylic acid having 6 to 12 carbon atoms and a glycol having 2 to 12 carbon atoms, and a phthalate (C), in which the mass ratio of the aliphatic diester (A) and the aromatic diester (B) satisfies aliphatic diester (A):aromatic diester (B)=65:35 to 95:5, and the mass ratio of the aliphatic diester (A), the aromatic diester (B), and the phthalate (C), satisfies (aliphatic diester (A)+aromatic diester (B)):phthalate (C)=5:95 to 35:65.

Advantageous Effects of Invention

According to the invention, it is possible to provide a plasticizer composition for a vinyl chloride resin, which can impart an excellent plasticization property and cold resistance to a vinyl chloride resin plastisol and is excellent in the non-bleeding property.

DESCRIPTION OF EMBODIMENTS

Hereinafter, an embodiment of the invention is described. The invention is not limited to the following embodiments, and can be implemented with appropriate modifications within the range in which the effects of the invention are not impaired.

[Plasticizer Composition for Vinyl Chloride Resin]

The plasticizer composition for a vinyl chloride resin of the invention (hereinafter, sometimes referred to as "plasticizer composition of the invention") includes an aliphatic diester (A) of an aliphatic dicarboxylic acid having 2 to 12 carbon atoms and an aliphatic monoalcohol having 4 to 18 carbon atoms, an aromatic diester (B) of an aromatic monocarboxylic acid having 6 to 12 carbon atoms and a glycol having 2 to 12 carbon atoms, and a phthalate (C).

Hereinafter, each component contained in the plasticizer composition of the invention is described.

(Aliphatic Diester (A))

The aliphatic diester (A) is a diester of an aliphatic dicarboxylic acid having 2 to 12 carbon atoms and an aliphatic monoalcohol having 4 to 18 carbon atoms.

The aliphatic diester (A) can enhance the non-bleeding property of the plasticizer composition of the invention.

The aliphatic dicarboxylic acid having 2 to 12 carbon atoms is preferably an alkylene dicarboxylic acid having 2 to 12 carbon atoms, more preferably an alkylene dicarboxylic acid having 4 to 12 carbon atoms, and still more preferably an alkylene dicarboxylic acid having 5 to 11 carbon atoms.

Examples of the aliphatic dicarboxylic acid having 2 to 12 carbon atoms include succinic acid, glutaric acid, adipic acid, azelaic acid, sebacic acid, dodecanedicarboxylic acid (dodecanedioic acid), cyclohexane dicarboxylic acid, and hexahydrophthalic acid. Among these, adipic acid, azelaic acid, sebacic acid, and dodecanedioic acid are preferable, adipic acid and sebacic acid are more preferable, and adipic acid is still more preferable.

The aliphatic dicarboxylic acid having 2 to 12 carbon atoms may be used alone or in combination of two or more kinds thereof.

The aliphatic monoalcohol having 4 to 18 carbon atoms is preferably an aliphatic monoalcohol having 6 to 18 carbon atoms, and more preferably an aliphatic monoalcohol having 7 to 13 carbon atoms.

Examples of the aliphatic monoalcohol having 4 to 18 carbon atoms include butanol, heptanol, hexanol, cyclohexanol, octanol, 2-ethylhexanol, isononyl alcohol, nonanol, decanol, 2-propylheptanol, undecanol, and dodecanol.

The monoalcohol having 4 to 18 carbon atoms may be used alone or in combination of two or more kinds thereof.

The aliphatic diester (A) is preferably a compound represented by the following general formula (A-1).

[Chem. 1]

(A-1)

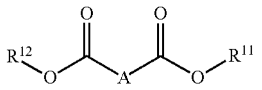

In the formula (A-1),

A is an alkylene group having 2 to 10 carbon atoms, and $R^{11}$ and $R^{12}$ are each independently alkyl groups having 4 to 18 carbon atoms.

In the general formula (A-1), A corresponds to an aliphatic dicarboxylic residual group, and $R^{11}$ and $R^{12}$ each correspond to aliphatic monoalcohol residual groups.

Here, "carboxylic acid residual group" refers to a remaining organic group except for a carboxyl group that the carboxylic acid has. Note that the number of carbon atoms in "carboxylic acid residual group" does not include the number of carbon atoms in a carboxyl group. In addition, "alcohol residual group" refers to a remaining organic group except for a hydroxyl group in an alcohol.

The aliphatic diester (A) contained in the plasticizer composition of the invention may be alone or in combination of two or more kinds thereof.

The aliphatic diester (A) is obtained, for example, by subjecting an aliphatic dicarboxylic acid and an aliphatic monoalcohol to a dehydration condensation reaction, and can be produced by a known method. Further, a commercially available product may also be used.

(Aromatic Diester (B))

The aromatic diester (B) is a diester of an aromatic monocarboxylic acid having 6 to 12 carbon atoms and a glycol having 2 to 12 carbon atoms.

Examples of the aromatic monocarboxylic acid having 6 to 12 carbon atoms include benzoic acid, dimethylbenzoic acid, trimethylbenzoic acid, tetramethylbenzoic acid, ethylbenzoic acid, propylbenzoic acid, butylbenzoic acid, cuminic acid, p-tert-butylbenzoic acid, o-toluic acid, m-toluic acid, p-toluic acid, ethoxybenzoic acid, propoxybenzoic acid, naphthoic acid, nicotinic acid, furoic acid, and anisic acid. Among these, benzoic acid is preferable.

The aromatic monocarboxylic acid having 6 to 12 carbon atoms may be used alone or in combination of two or more kinds thereof.

The glycol having 2 to 12 carbon atoms is preferably an alkylene glycol having 2 to 12 carbon atoms or an oxyalkylene glycol having 2 to 12 carbon atoms.

Examples of the alkylene glycol having 2 to 12 carbon atoms include ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, cyclohexanedimethanol, 2,2,4-trimethyl-1,3-pentanediol, 2-ethyl-1,3-hexanediol, 2-methyl-1,8-octanediol, 1,9-nonanediol, and 1,10-decanediol.

The alkylene glycol having 2 to 12 carbon atoms is preferably an alkylene glycol having 3 to 10 carbon atoms, more preferably an alkylene glycol having 3 to 6 carbon atoms, and still more preferably 1,2-propanediol, 1,3-butanediol, 1,4-butanediol, neopentyl glycol, 2-methyl-1,3-propanediol, 3-methyl-1,5-pentanediol, or 1,6-hexanediol.

The oxyalkylene glycol having 2 to 12 carbon atoms is obtained, for example, by replacing one carbon atom of the alkylene glycol having 2 to 12 carbon atoms with an oxygen atom, and examples thereof include diethylene glycol, triethylene glycol, tetraethylene glycol, dipropylene glycol, and tripropylene glycol.

The oxyalkylene glycol having 2 to 12 carbon atoms is preferably an oxyalkylene glycol having 3 to 10 carbon atoms, more preferably an oxyalkylene glycol having 4 to 10 carbon atoms, and still more preferably diethylene glycol or dipropylene glycol.

The glycol having 2 to 12 carbon atoms may be used alone or in combination of two or more kinds thereof.

The aromatic diester (B) is preferably a compound represented by the following general formula (B-1).

[Chem. 2]

(B-1)

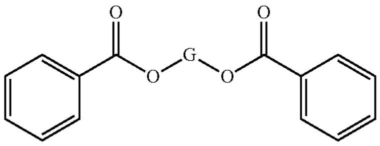

In the formula (B-1),

G is an alkylene group having 2 to 12 carbon atoms or an oxyalkylene group having 2 to 12 carbon atoms.

In the general formula (B-1), G corresponds to a glycol residual group.

Here, "glycol residual group" refers to a remaining organic group except for a hydroxyl group in glycol.

The aromatic diester (B) contained in the plasticizer composition of the invention may be alone or in combination of two or more kinds thereof.

The aromatic diester (B) is obtained, for example, by subjecting an aromatic monocarboxylic acid and a glycol to a dehydration condensation reaction, and can be produced by a known method. Further, a commercially available product may also be used.

(Phthalate (C))

Phthalate (C) is, for example, a compound represented by the following general formula (C-1).

[Chem. 3]

(C-1)

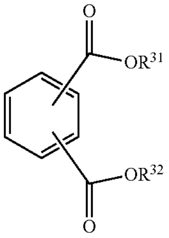

In the formula (C-1), $R^{31}$ and $R^{32}$ are each independently alkyl groups having 1 to 15 carbon atoms.

Examples of the phthalate (C) include dibutyl phthalate (DBP), di (2-ethylhexyl) phthalate (DOP), diisononyl phthalate (DINP), di (2-propylheptyl) phthalate (DPHP), diisodecyl phthalate (DIDP), diundecyl phthalate (DUP), ditridecyl phthalate (DTDP), bis (2-ethylhexyl) terephthalate (DOTP), and bis (2-ethylhexyl) isophthalate (DOIP).

The phthalate (C) contained in the plasticizer composition of the invention may be alone or in combination of two or more kinds thereof.

The phthalate (C) is obtained, for example, by subjecting phthalic acid and an aliphatic monoalcohol to a dehydration condensation reaction, and can be produced by a known method. Further, a commercially available product may also be used.

The plasticizer composition of the invention may include the aliphatic diester (A), the aromatic diester (B), and the phthalate (C), or may consist essentially of the aliphatic diester (A), the aromatic diester (B), and the phthalate (C).

Here, "consist essentially of" means that the content ratio of the aliphatic diester (A), the aromatic diester (B), and the phthalate (C) in the plasticizer composition of the invention is, for example, 90% by mass or more, 95% by mass or more, 97% by mass or more, 99% by mass or more, or 100% by mass.

In the plasticizer composition of the invention, the mass ratio of the aliphatic diester (A) and the aromatic diester (B) satisfies aliphatic diester (A):aromatic diester (B)=65:35 to 95:5, and preferably satisfies aliphatic diester (A):aromatic diester (B)=70:30 to 90:10.

When the mass ratio of the aliphatic diester (A) and the aromatic diester (B) satisfies the above, the viscosity stability of the plastisol of the invention described later can be enhanced.

In the plasticizer composition of the invention, the mass ratio of the total mass of the aliphatic diester (A) and the aromatic diester (B) and the mass of the phthalate (C) satisfies (aliphatic diester (A)+aromatic diester (B)):phthalate (C)=5:95 to 35:65, and preferably satisfies (aliphatic diester (A)+aromatic diester (B)):phthalate (C)=10:90 to 30:70.

[Plastisol]

The plastisol of the invention includes the plasticizer composition for a vinyl chloride resin of the invention and a vinyl chloride resin.

The vinyl chloride resin includes a homopolymer of vinyl chloride, a homopolymer of vinylidene chloride, a copolymer containing vinyl chloride as an essential component, a copolymer containing vinylidene chloride as an essential component, and the like.

When the vinyl chloride resin is a copolymer containing vinyl chloride as an essential component or a copolymer containing vinylidene chloride as an essential component, examples of the comonomer that can be copolymerized include vinyl esters such as vinyl acetate, vinyl propionate and vinyl stearate; vinyl ethers such as vinyl methyl ether and vinyl isobutyl ether; maleic acid esters such as diethyl maleate; fumaric acid esters such as dibutyl fumarate; (meth) acrylic acid alkyl esters such as methyl acrylate, ethyl acrylate and 2-ethylhexyl acrylate; (meth) acrylic acid hydroxyalkyl esters such as 2-hydroxyethyl acrylate, 2-hydroxyethyl methacrylate, hydroxypropyl acrylate and hydroxypropyl methacrylate; (meth) acrylic acid hydroxyalkylamides such as N-methylolacrylamide, N-methylolmethacrylamide, N-hydroxyethylacrylamide and N-dihydroxyethylmethacrylamide; acrylonitrile and vinylidene chloride.

From the viewpoint of physical properties such as the chipping resistance, the average degree of polymerization of the vinyl chloride resin is preferably in the range of 500 to 2,500, and more preferably in the range of 800 to 2,300.

The vinyl chloride resin used for the plastisol is usually in the form of fine particles, and the average particle diameter thereof is, for example, in the range of 0.1 to 10 μm, preferably in the range of 0.1 to 5 μm, and more preferably in the range of 0.1 to 2 μm.

The vinyl chloride resin can be produced by a known method, and a commercially available product may be used.

The content of the plasticizer composition for a vinyl chloride resin of the invention in the plastisol of the invention is preferably in the range of 10 to 150 parts by mass, more preferably in the range of 30 to 120 parts by mass, still more preferably in the range of 40 to 110 parts by mass, and particularly preferably in the range of 50 to 100 parts by mass, with respect to 100 parts by mass of the vinyl chloride resin, from the viewpoint of compatibility with the vinyl chloride resin, and the like.

The plastisol of the invention includes the vinyl chloride resin and the plasticizer composition for a vinyl chloride resin of the invention, and may contain a plasticizer (other plasticizer) other than the plasticizer composition for a vinyl chloride resin of the invention, other additives, and the like within the range in which the effects of the invention are not impaired.

Examples of the other plasticizers include benzoic acid esters such as diethylene glycol dibenzoate; pyromellitic acid esters such as tetra(2-ethylhexyl) pyromellitate (TOPM); aliphatic dibasic acid esters such as di (2-ethylhexyl) adipate (DOA), diisononyl adipate (DINA), diisodecyl adipate (DIDA), di (2-ethylhexyl) sebacate (DOS), and diisononyl sebacate (DINS); phosphoric acid esters such as tri(2-ethylhexyl) phosphate (TOP) and tricresyl phosphate (TCP); alkyl esters of polyhydric alcohols such as pentaerythritol; polyesters having 800 to 4,000 molecular weight synthesized by polyesterifying dibasic acids such as adipic acid and glycols; epoxidized esters such as epoxidized soybean oil and epoxidized linseed oil; alicyclic dibasic acids such as diisononyl hexahydrophthalate; fatty acid glycol esters such as 1.4,-butanediol dicaprate; acetyl tributyl citrate (ATBC); chlorinated paraffin obtained by chlorinating paraffin wax or n-paraffin; chlorinated fatty acid esters such as chlorinated stearate; and higher fatty acid esters such as butyl oleate.

When the other plasticizer is used in the plastisol of the invention, the content of the other plasticizer is, for example, in the range of 10 to 300 parts by mass, and preferably in the range of 20 to 200 parts by mass, with respect to 100 parts by mass of the plasticizer for a vinyl chloride resin of the invention.

Note that since a sufficient plasticization performance can be obtained by using the plasticizer composition of the invention, the plastisol of the invention may be a plastisol that does not contain the other plasticizer.

Examples of the other additives include a filler.

Examples of the filler include calcium carbonate, magnesium carbonate, barium sulfate, mica, graphite, talc, clay, glass flake, glass bead, vermiculite, kaolinite, wollastonite, silica, diatomaceous earth, gypsum, cement, converter slag, shirasu, zeolite, cellulose powder, powder rubber, zonolite, potassium titanate, bentonite, aluminum nitride, silicon nitride, zinc oxide, titanium oxide, calcium oxide, alumina, zinc oxide, iron oxide, magnesium oxide, titanium oxide, magnesium hydroxide, aluminum hydroxide, and calcium silicate.

Fibrous fillers such as calcium carbonate whiskers, ceramic short fibers, rockwool short fibers, glass fiber short fibers, potassium titanate short fibers, calcium silicate short fibers, aluminum silicate, carbon fiber short fibers, aramid fiber short fibers, and sepiolite; hollow fillers such as glass balloons, silica balloons, resin balloons, and carbon inorganic hollow spheres; organic hollow fillers such as plastic balloons made of organic synthetic resins such as vinylidene chloride and acrylonitrile; or metallic fillers such as aluminum fillers can be also used as the filler.

The content of the filler in the plastisol of the invention may be appropriately set according to the use, and is, for example, in the range of 50 to 800 parts by mass with respect to 100 parts by mass of the vinyl chloride resin.

The other additives are not limited to the filler, and an adhesion imparting agent, a viscosity modifier, a stabilizer, a pigment, a moisture absorbent, an antioxidant, an ultraviolet absorber, a diluent, a curing agent, a leveling agent, a drip stopping agent, an auxiliary resin, an organic solvent, a flame retardant, an antirust agent, an anti-aging agent, and the like may be added as necessary.

The plastisol of the invention can be produced by a known method.

For example, the plastisol of the invention can be prepared by mixing a vinyl chloride resin, the plasticizer composition for a vinyl chloride resin of the invention, and optional components (the other plasticizer and the other additive) using a kneader such as a blender, a planetary mixer, or a Banbury mixer.

A coating film can be formed by applying the plastisol of the invention to a desired place to an arbitrary thickness by a known coating method such as brush coating, roller coating, air spray coating, electrostatic coating, or airless spray coating, and then by heating or the like.

The plastisol of the invention can be used as a coating material, an ink, an adhesive, a gluing agent, a sealing agent, or the like. Further, the plastisol of the invention can be applied to molded products such as miscellaneous goods, toys, industrial parts, and electrical parts.

When the plastisol of the invention is applied to a paper cloth or the like, an artificial leather, a carpet, a wallpaper, clothes, a waterproof sheet or the like can be obtained, and when applied to a metal plate, a corrosion-resistant metal plate can be obtained.

The plastisol of the invention can be suitably used for an automobile, and specifically, the plastisol is suitably applied to a floor-back portion, a wheel house portion, a front portion, a rear fender portion, a front apron portion, a side sill portion (rocker panel portion), and the like of an automobile. Further, it is also suitably applied to joints, seams, edges and the like of steel plates constituting car bodies.

EXAMPLES

Hereinafter, the invention is specifically described by way of Examples and Comparative Examples.

Note that the invention is not limited to the following Examples.

In Examples of the application, the values of acid value and viscosity are values evaluated by the following methods.

<Method for Measuring Acid Value>

It was measured by a method according to JIS K0070: 1992.

<Method for Measuring Viscosity>

It was measured by a method according to JIS K6901: 1986.

Synthesis Example 1: Synthesis of Aromatic Diester PGDB

Into a reaction container, 900 g (7.38 mol) of benzoic acid (manufactured by Emerald Kalama Chemical LLC), 322 g (4.24 mol) of 1,2-propylene glycol (manufactured by AGC Inc.), and 0.373 g of tetraisopropyl titanate as an esterifying catalyst were placed in a four-neck flask having an internal volume of two liters equipped with a thermometer, a stirrer, and a reflux cooler, and the temperature was increased stepwise to 230° C. while stirring under a nitrogen gas stream. Heating was continued at 230° C. until the acid value became 2 or less, and the produced water was continuously removed.

After the reaction, unreacted propyleneglycol was distilled off under reduced pressure at 230 to 200° C. to obtain 949 g of propyleneglycol dibenzoate (PGDB, acid value of 0.02, viscosity of 75 mPa-s (25° C.)) as an aromatic diester.

Synthesis Example 2: Synthesis of Aromatic Diester DEGDB

Into a reaction container, 783 g (6.42 mol) of benzoic acid (manufactured by Emerald Kalama Chemical LLC), 374 g (3.53 mol) of diethylene glycol (manufactured by Mitsubishi Chemical Corporation), and 0.347 g of tetraisopropyl titanate as an esterifying catalyst were placed in a four-neck flask having an internal volume of two liters equipped with a thermometer, a stirrer, and a reflux cooler, and the temperature was increased stepwise to 230° C. while stirring under a nitrogen gas stream. Heating was continued at 230° C. until the acid value became 2 or less, and the produced water was continuously removed.

After the reaction, unreacted diethylene glycol was distilled off under reduced pressure at 230 to 200° C. to obtain 943 g of diethylene glycol dibenzoate (DEGDB, acid value of 0.02, viscosity of 77 mPa-s (25° C.)) as an aromatic diester.

Synthesis Example 3: Synthesis of Aromatic Diester DPGDB

Into a reaction container, 780 g (6.39 mol) of benzoic acid (manufactured by Emerald Kalama Chemical LLC), 471 g (3.51 mol) of dipropylene glycol (manufactured by AGC Inc.), and 0.378 g of tetraisopropyl titanate as an esterifying catalyst were placed in a four-neck flask having an internal volume of two liters equipped with a thermometer, a stirrer, and a reflux cooler, and the temperature was increased stepwise to 230° C. while stirring under a nitrogen gas stream. Heating was continued at 230° C. until the acid value became 2 or less, and the produced water was continuously removed.

After the reaction, unreacted dipropylene glycol was distilled off under reduced pressure at 230 to 200° C. to obtain 957 g of dipropylene glycol dibenzoate (DPGDB, acid value of 0.01, viscosity of 140 mPa-s (25° C.)) as an aromatic diester.

Examples 1 to 9 and Comparative Examples 1 to 6: Preparation and Evaluation of Vinyl Chloride Resin Plastisol In preparing a vinyl chloride resin plastisol, the following plasticizer components were prepared:

DOA: di (2-ethylhexyl) adipate

DINA: diisononyl adipate

DOS: di (2-ethylhexyl) sebacate

PGDB: propylene glycol dibenzoate

DPGDB: dipropylene glycol dibenzoate

DEGDB: diethylene glycol dibenzoate
IDB: isodecyl benzoate
DINP: diisononyl phthalate For the plasticizing components, DOA is Monocizer W-240 manufactured by DIC Corporation, DINA is Monocizer W-242 manufactured by DIC Corporation, DOS is Monocizer W-280 manufactured by DIC Corporation, DINP is Sanso Cizer DINP manufactured by New Japan Chemical Co., Ltd., and IDB is Jayflex MB-10 manufactured by Exxon Mobil Corporation.

100 parts by mass of polyvinyl chloride resin (polymerization degree of 1550, ZEST P21, manufactured by Shindai-Ichi Vinyl Corporation), the total of 100 parts by mass of plasticizers shown in Tables 1 and 2, and 3 parts by mass of the filler (Greg ML-610 (calcium/zinc-based composite stabilizer) manufactured by Nisshin Trading Co., Ltd.) were mixed, mixing-stirring was performed under the conditions of a revolution number for stirring of 1100 rpm using a mixing stirrer for 4 minutes, static defoaming was performed under reduced pressure for 30 minutes, whereby each of the vinyl chloride resin compositions having a paste sol form (the vinyl chloride resin plastisols) was prepared.

The vinyl chloride resin plastisol thus obtained was evaluated as follows. The results obtained are shown in Tables 1 and 2.

(Evaluation of Viscosity Stability)

Each of the viscosity stabilities of the vinyl chloride resin plastisols was evaluated using a B-type rotational viscosimeter (manufactured by Toki Sangyo Co., Ltd.) in accordance with JIS K7117-1:1999.

Specifically, each of the viscosities of the vinyl chloride resin plastisols immediately after preparation was measured using a BM-type viscosimeter (at 12 rpm with the rotor No. 3, measurement temperature of 25° C.), and the measured viscosity was used as the initial sol viscosity. After the measurement of the initial sol viscosity, the vinyl chloride resin plastisol was allowed to stand at 25° C. for 7 days, and the sol viscosity was measured again after 7 days by the same method (sol viscosity after 7 days). The thickening ratio (sol viscosity after 7 days/initial sol viscosity) was calculated using the value of the initial sol viscosity and the value of the sol viscosity after 7 days, and the viscosity stability was evaluated according to the following criteria.

A: Thickening ratio was less than 1.3 times.

B: Thickening ratio was 1.3 times or more.

(Evaluation of Plasticization Performance of Plasticizer)

Each of the vinyl chloride resin plastisols was coated on a glass plate to the thickness of 1 mm, and then baked at 140° C. for 25 minutes using an oven (LTF-ST, manufactured by Warner Mathis AG) to prepare a sheet having the thickness of 1.0 mm.

The 100% modulus (tensile stress at 100% of elongation) and the breaking elongation of the obtained sheet were evaluated in accordance with JIS K6251:2010. Specifically, using the sheet having the thickness of 1.0 mm, a tensile test was performed under the following conditions to evaluate the 100% modulus and the breaking elongation.

Note that the breaking elongation is a value obtained by subtracting the initial length between chucks of 20 mm from the length between chucks at the time of tensile breaking of the sheet having the thickness of 1.0 mm, dividing the resulting value by the length between chucks of 20 mm, and expressing the value in percentage.

Measuring device: Tensilon Universal Material Testing Machine (manufactured by Orientec Co., Ltd.)

Sample shape: dumbbell shape No. 3

Length between chucks: 20 mm

Tension speed: 200 mm/minutes

Measurement atmosphere: temperature of 23° C., humidity of 50%

The lower the value of the 100% modulus, the higher the effect of plasticizing the vinyl chloride resin. Further, the higher the elongation at break, the higher the effect of plasticizing the vinyl chloride resin.

(Evaluation of Low-Temperature Flexibility of Molded Product)

A sheet having the thickness of 1.0 mm was prepared in the same manner as in the evaluation of plasticization performance.

For the obtained sheet, a test piece was prepared in accordance with the test method defined in JIS K6773:2007, and the softening temperature (unit: ° C.) was evaluated using a Clash-berg softening temperature measurement tester. The lower the softening temperature, the more excellent the cold resistance.

(Evaluation of Gelation Property of Vinyl Chloride Resin Composition)

The dynamic viscoelasticity of the polyvinyl chloride resin composition was measured using a rheometer ("HAAKE RS600" manufactured by Thermo Fisher Scientific Inc.) under the conditions of the frequency of 1 Hz, the distortion of 1%, and the temperature increase of 4° C./minute. The gelation property was evaluated from the temperature at which the storage elastic modulus G' reached the maximum value according to the following criteria:

A: The temperature at which the storage elastic modulus G' became the maximum value was lower than 140° C.

B: The temperature at which the storage elastic modulus G' became the maximum value was 140° C. or higher.

(Evaluation of Compatibility of Plasticizer)

A sheet having the thickness of 1.0 mm was prepared in the same manner as in the evaluation of plasticization performance. The sheet was cut into the size of 5 cm×5 cm to prepare two sheets of 1.0 mm thickness. Two sheets thus prepared were stacked each other and allowed to stand for 30 days under the conditions of 70° C. and the relative humidity of 95%. Thereafter, the states of the surfaces of the sheets and the faces where the sheets were stacked with each other were evaluated by the following evaluation criteria.

A: When the surfaces of the sheets and the faces where the sheets were stacked with each other were visually observed, powdery or viscous foreign matter (bleeding) could not be observed, and even when the surfaces of the sheet and the faces where the sheets were stacked with each other were touched with a finger, bleeding could not be verified.

B: When the surfaces of the sheets and the faces where the sheets were stacked with each other were visually observed, bleeding could be observed, or when the surfaces of the sheets and the faces where the sheets were stacked with each other were touched with a finger, bleeding could be verified.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Composition [part(s) by mass] | Vinyl Chloride Resin | | 100 | 100 | 100 | 100 | 100 | 100 | 100 | 100 | 100 |
| | Ca/Zn stabilizer | | 3 | 3 | 3 | 3 | 3 | 3 | 3 | 3 | 3 |
| | Aliphatic Diester | DOA | 16 | | | | | | | | |
| | | DINA | | 21 | 27 | 16 | 7 | 9 | 16 | 16 | |
| | | DOS | | | | | | | | | 7 |
| | Aromatic Diester | PGDB | 4 | 9 | 3 | 4 | 3 | 1 | | 1.2 | 3 |
| | | DPGDB | | | | | | | 4 | | |
| | | DEGDB | | | | | | | | 2.8 | |
| | Aromatic Monoester | IDB | | | | | | | | | |
| | Phthalate | DINP | 80 | 70 | 70 | 80 | 90 | 90 | 80 | 80 | 90 |
| Viscosity Stability | Initial Viscosity [mPa · s] | | 620 | 710 | 650 | 630 | 610 | 560 | 680 | 640 | 650 |
| | Viscosity After 7 Days [mPa · s] | | 690 | 900 | 750 | 710 | 690 | 590 | 770 | 730 | 710 |
| | Thickening ratio [—] | | 1.11 | 1.27 | 1.15 | 1.13 | 1.13 | 1.05 | 1.13 | 1.14 | 1.09 |
| | Evaluation of Viscosity Stability | | A | A | A | A | A | A | A | A | A |
| Plasticization Effect | 100% Modulus [Mpa] | | 2.8 | 3.1 | 2.6 | 2.8 | 3.3 | 2.9 | 2.7 | 2.7 | 2.5 |
| | Elongation [%] | | 164 | 179 | 162 | 167 | 163 | 157 | 175 | 170 | 190 |
| Cold Resistance | Low-Temperature Flexibility Temperature [° C.] | | −64 | −63 | −65 | −64 | −60 | −62 | −65 | −65 | −69 |
| Gelation Property | | | A | A | A | A | A | A | A | A | A |
| Compatibility | | | A | A | A | A | A | A | A | A | A |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Composition [part(s) by mass] | Vinyl Chloride Resin | | 100 | 100 | 100 | 100 | 100 | 100 |
| | Ca/Zn Stabilizer | | 3 | 3 | 3 | 3 | 3 | 3 |
| | Aliphatic Diester | DOA | | | | | | |
| | | DINA | | 20 | | 28 | 12 | |
| | | DOS | | | | | | |
| | Aromatic Diester | PGDB | | | 20 | 12 | 8 | |
| | | DPGDB | | | | | | |
| | | DEGDB | | | | | | |
| | Aromatic Monoester | IDB | | | | | | 20 |
| | Phthalate | DINP | 100 | 80 | 80 | 60 | 80 | 80 |
| Viscosity Stability | Initial Viscosity [mPa · s] | | 860 | 570 | 840 | 760 | 680 | 540 |
| | Viscosity After 7 Days [mPa · s] | | 910 | 580 | 1640 | 1100 | 920 | 640 |
| | Thickening ratio [—] | | 1.06 | 1.02 | 1.95 | 1.45 | 1.35 | 1.19 |
| | Evaluation of Viscosity Stability | | A | A | B | B | B | A |
| Plasticization Effect | 100% Modulus [Mpa] | | 3.5 | 2.6 | 3.6 | 3.0 | 3.3 | 3.3 |
| | Elongation [%] | | 145 | 153 | 231 | 180 | 184 | 153 |
| Cold Resistance | Low-Temperature Flexibility Temperature [° C.] | | −56 | −67 | −51 | −65 | −61 | −59 |
| Gelation Property | | | A | B | A | A | A | A |
| Compatibility | | | A | A | A | A | A | B |

In Tables 1 and 2, in Comparative Example 2 in which the plasticizer component contained the aliphatic diester but did not contain the aromatic diester, the gelation was insufficient. On the other hand, in Comparative Example 3 in which the plasticizer component contained the aromatic diester but did not contain the aliphatic diester, the viscosity stability was not obtained. In addition, in Comparative Examples 4 and 5, the plasticizer component contained both the aliphatic diester and the aromatic diester, but the amount of the aromatic diester was large, and thus the viscosity stability was not obtained. In Comparative Example 6, the plasticizer component contained an aromatic monoester, but the compatibility was not sufficient and bleeding occurred.

In contrast, in Examples 1-9, it was verified that the plasticization property and the cold resistance were good as compared with Comparative Example 1 in which the plasticizer composition of the invention was not contained, and it was found that the plasticization property, the cold resistance, and the compatibility were excellent as compared with Comparative Example 6 in which the aromatic monoester was used.

The invention claimed is:

1. A plasticizer composition for a vinyl chloride resin comprising an aliphatic diester (A) of an aliphatic dicarboxylic acid having 2 to 12 carbon atoms and an aliphatic monoalcohol having 4 to 18 carbon atoms, an aromatic diester (B) of an aromatic monocarboxylic acid having 6 to 12 carbon atoms and a glycol having 2 to 12 carbon atoms, and a phthalate (C), wherein a mass ratio of the aliphatic diester (A) and the aromatic diester (B) satisfies aliphatic diester (A): aromatic diester (B)=65:35 to 95:5, and a mass ratio of the aliphatic diester (A), the aromatic diester (B), and the phthalate (C) satisfies (aliphatic diester (A)+aromatic diester (B)): phthalate (C)=5:95 to 35:65.

2. The plasticizer composition for a vinyl chloride resin according to claim 1, wherein the aliphatic dicarboxylic acid having 2 to 12 carbon atoms is one or more selected from the group consisting of succinic acid, glutaric acid, adipic acid, azelaic acid, sebacic acid, dodecanedicarboxylic acid, cyclohexane dicarboxylic acid, and hexahydrophthalic acid.

3. The plasticizer composition for a vinyl chloride resin according to claim 1, wherein the aliphatic monoalcohol having 4 to 18 carbon atoms is one or more selected from the group consisting of butanol, heptanol, hexanol, cyclohexanol, octanol, 2-ethylhexanol, isononyl alcohol, nonanol, decanol, 2-propylheptanol, undecanol, and dodecanol.

4. The plasticizer composition for a vinyl chloride resin according to claim 1, wherein the aromatic monocarboxylic acid having 6 to 12 carbon atoms is one or more selected from the group consisting of benzoic acid, dimethylbenzoic acid, trimethylbenzoic acid, tetramethylbenzoic acid, ethylbenzoic acid, propylbenzoic acid, butylbenzoic acid, cuminic acid, p-tert-butylbenzoic acid, o-toluic acid, m-toluic acid, p-toluic acid, ethoxybenzoic acid, propoxybenzoic acid, naphthoic acid, nicotinic acid, furoic acid, and anisic acid.

5. The plasticizer composition for a vinyl chloride resin according to claim 1, wherein the glycol having 2 to 12 carbon atoms is one or more selected from the group consisting of 1,2-propanediol, 1,3-propanediol, 1,3-butanediol, 1,4-butanediol, neopentyl glycol, 2-methyl-1,3-propanediol, 3-methyl-1,5-pentanediol, 1,6-hexanediol, diethylene glycol, and dipropylene glycol.

6. The plasticizer composition for a vinyl chloride resin according to claim 1, wherein the phthalate (C) is one or more selected from the group consisting of dibutyl phthalate, di (2-ethylhexyl) phthalate, diisononyl phthalate, di (2-propylheptyl) phthalate, diisodecyl phthalate, diundecyl phthalate, ditridecyl phthalate, bis(2-ethylhexyl) terephthalate, and bis(2-ethylhexyl) isophthalate.

7. A plastisol comprising the plasticizer composition for a vinyl chloride resin according to claim 1 and a vinyl chloride resin.

8. The plastisol according to claim 7, wherein a content of the plasticizer composition for a vinyl chloride resin is in a range of 10 to 150 parts by mass with respect to 100 parts by mass of the vinyl chloride resin.

9. A coating film prepared using the plastisol according to claim 7.

10. The plasticizer composition for a vinyl chloride resin according to claim 2, wherein the aliphatic monoalcohol having 4 to 18 carbon atoms is one or more selected from the group consisting of butanol, heptanol, hexanol, cyclohexanol, octanol, 2-ethylhexanol, isononyl alcohol, nonanol, decanol, 2-propylheptanol, undecanol, and dodecanol.

11. The plasticizer composition for a vinyl chloride resin according to claim 2, wherein the aromatic monocarboxylic acid having 6 to 12 carbon atoms is one or more selected from the group consisting of benzoic acid, dimethylbenzoic acid, trimethylbenzoic acid, tetramethylbenzoic acid, ethylbenzoic acid, propylbenzoic acid, butylbenzoic acid, cuminic acid, p-tert-butylbenzoic acid, o-toluic acid, m-toluic acid, p-toluic acid, ethoxybenzoic acid, propoxybenzoic acid, naphthoic acid, nicotinic acid, furoic acid, and anisic acid.

12. The plasticizer composition for a vinyl chloride resin according to claim 3, wherein the aromatic monocarboxylic acid having 6 to 12 carbon atoms is one or more selected from the group consisting of benzoic acid, dimethylbenzoic acid, trimethylbenzoic acid, tetramethylbenzoic acid, ethylbenzoic acid, propylbenzoic acid, butylbenzoic acid, cuminic acid, p-tert-butylbenzoic acid, o-toluic acid, m-toluic acid, p-toluic acid, ethoxybenzoic acid, propoxybenzoic acid, naphthoic acid, nicotinic acid, furoic acid, and anisic acid.

13. The plasticizer composition for a vinyl chloride resin according to claim 2, wherein the glycol having 2 to 12 carbon atoms is one or more selected from the group consisting of 1,2-propanediol, 1,3-propanediol, 1,3-butanediol, 1,4-butanediol, neopentyl glycol, 2-methyl-1,3-propanediol, 3-methyl-1,5-pentanediol, 1,6-hexanediol, diethylene glycol, and dipropylene glycol.

14. The plasticizer composition for a vinyl chloride resin according to claim 3, wherein the glycol having 2 to 12 carbon atoms is one or more selected from the group consisting of 1,2-propanediol, 1,3-propanediol, 1,3-butanediol, 1,4-butanediol, neopentyl glycol, 2-methyl-1,3-propanediol, 3-methyl-1,5-pentanediol, 1,6-hexanediol, diethylene glycol, and dipropylene glycol.

15. The plasticizer composition for a vinyl chloride resin according to claim 4, wherein the glycol having 2 to 12 carbon atoms is one or more selected from the group consisting of 1,2-propanediol, 1,3-propanediol, 1,3-butanediol, 1,4-butanediol, neopentyl glycol, 2-methyl-1,3-propanediol, 3-methyl-1,5-pentanediol, 1,6-hexanediol, diethylene glycol, and dipropylene glycol.

16. The plasticizer composition for a vinyl chloride resin according to claim 2, wherein the phthalate (C) is one or more selected from the group consisting of dibutyl phthalate, di (2-ethylhexyl) phthalate, diisononyl phthalate, di (2-propylheptyl) phthalate, diisodecyl phthalate, diundecyl phthalate, ditridecyl phthalate, bis(2-ethylhexyl) terephthalate, and bis(2-ethylhexyl) isophthalate.

17. The plasticizer composition for a vinyl chloride resin according to claim 3 wherein the phthalate (C) is one or more selected from the group consisting of dibutyl phthalate, di (2-ethylhexyl) phthalate, diisononyl phthalate, di (2-propylheptyl) phthalate, diisodecyl phthalate, diundecyl phthalate, ditridecyl phthalate, bis(2-ethylhexyl) terephthalate, and bis(2-ethylhexyl) isophthalate.

18. A plastisol comprising the plasticizer composition for a vinyl chloride resin according to claim 2 and a vinyl chloride resin.

19. A plastisol comprising the plasticizer composition for a vinyl chloride resin according to claim 3 and a vinyl chloride resin.

20. A coating film prepared using the plastisol according to claim 8.

* * * * *